United States Patent Office 2,724,307
Patented Nov. 22, 1955

2,724,307

MANUFACTURE OF WOOD-FIBER HARDBOARD

Basil O. Stewart, Kenmore, N. Y., assignor to National Gypsum Company, Buffalo, N. Y., a corporation of Delaware No Drawing. Application September 23, 1954,
Serial No. 457,997

6 Claims. (Cl. 92—39)

This invention relates to the manufacture of heat and pressure-consolidated, wood-fiber hardboard. More particularly it is directed to a process for the preparation of ligno-cellulose materials in the form of wood chips for the manufacture of wood-fiber hardboard.

The manufacture of wood-fiber hardboard consists of both a chemical and mechanical preparation of the fibrous woody raw material, followed by a high temperature, high pressure consolidation of the fibrous matter into a commercially acceptable, high density building board, with a specific gravity in the order of .9 to 1.4. Some of the desired characteristics in such hardboard are high density, dimensional stability, high rupture strength, abrasion resistance, resistance to water and the other elements, and generally a high degree of cohesiveness.

The present invention is directed, chiefly, to the chemical preparation or conversion of the fibrous woody material, with the object of substantially eliminating losses in the ligno-cellulose material during conversion and to provide, generally, marked improvements in the above described characteristics of wood-fiber hardboard. It is a well recognized fact in the hardboard industry that certain processing of the raw woody materials is essential prior to the consolidation into hardboard; that the wood fibers in their naturally occurring form are not suited for immediate heat and pressure consolidation. The usual and preferred prior method for the conversion of the wood or ligno-cellulose into suitable form has ordinarily consisted of a rapid high temperature steam treatment, with processing steam pressures of about 1000 lbs. per sq. in. and exceedingly high temperatures. Considerable complex and costly equipment is required for such treatment, and thus, substantially all developments and improvement in the process over the years have been directed toward methods requiring, or suitably adapted to, such equipment.

To understand the present invention and its numerous advantages, it is not necessary to attempt to present an exact and complete explanation of the theories involved in the processing of the ligno-cellulose, however, consideration need be given to a certain few factors involved therein. Essentially, the ligno-cellulose or woody material consists of the cellulose or basic fibrous matter and the lignins or binding matter. The previously described high temperature conversion is directed to modifying the lignins, which is considered to be a depolymerization and a consequent agglomeration or repolymerization to a more resinous or gummy form.

Two disadvantages of particular concern in the prior methods are the excessive material loss by the rapid pyrolysis of the cellulose ingredients to worthless sugars, decreasing the process yield, and second, the loss to the steam or subsequent liquors of the dispersible lignins, further decreasing the ultimate process yield, both said losses creating a serious disposal or stream pollution problem. The estimated yield, by weight, in the prior processes was in the order of 65–75% of the original raw material weight.

It is a further object of the invention to provide, in the manufacture of molded fiber hardboard, a process for the polymerization of dispersible lignins wherein approximately 95% of the ligno-cellulose is recovered and in which the dispersible lignins are suitably polymerized and resinified and deposited on or dispersed in the ligno-cellulosic material.

Another object of the invention is to provide a process for producing an improved hardboard, materially strengthened by the markedly increased polymerization and retention of resinified non-cellulosic material and very substantial reduction of fiber loss and damage in the processing of the raw materials therefor.

Other objects and advantages of the invention will appear more clearly when considered in connection with the following description of a preferred embodiment of the invention.

In known methods of making fibrous products, of the general classification of the product manufactured in accordance with the invention, it has been customary to first reduce or fragmentize the woody raw material to the form of chips of a size in the order of 1/4" x 3/4" across the grain and 3/4" with the grain. Such a standard wood particle or chip size from a soft or coniferous wood source will be considered in the preferred embodiment of the invention discussed herebelow, it being understood that any variation in the size or source may require variations in the time or temperature factors involved. It is preferable in accordance with the invention, that one dimension across the chip grain in a major portion of the chips, be no greater than about 1/2". Furthermore, the dimension with the grain should preferably be greater than about 3/8" or 1/2" to provide suitable resultant fibers.

The term chips as used in the appended claims will be understood to mean a raw material in suitable form for conversion, which for most woody material will be substantially as defined hereabove, and for other sources of ligno-cellulose may vary considerably so long as the major portion of the material provides a fiber of suitable length and the so-called chips are not of such excessive size as to preclude a suitable conversion in accordance with the invention throughout the mass.

In accordance with the invention, the above prepared wood chips are fed to a pressure-tight hydrolysis chamber, suitable for maintaining a pressure of approximately 500 p. s. i., and containing all of a residual aqueous liquor recovered after separation of the processed chips therefrom in an immediately prior cycle. An amount of make-up water is added to the liquor such that the chips are not compacted, but are substantially freely dispersed throughout and surrounded by the liquor, and the physical and chemical condition of these constituents, would be difficult if not impossible to attempt. Suffice it to say, the liquor contains the hydrolyzed water dispersible and soluble portions of the ligno-cellulosic material of prior cycles, which materials tend to maintain a pH of the liquor in the order of 3.0. The condition of the hydrolyzed dispersed and dissolved elements can reasonably be described as in the process of polymerization, resinification, and insolubilization. The acidity is created by the naturally formed pyroligneous acids, which acids may be considered primary reagents in the above described polymerization, resinification and insolubilization.

It has now been found, in accordance with the invention, that in an aqueous environment under substantially continuous high temperature-pressure conditions as described herebelow, and with the continual periodic addition of fresh lignin dispersants and removal of polymerized material, substantially all of the dissolved and dispersed non-cellulosic material will react of itself, an autogenous reaction, to polymerize and precipitate by adhesion to subsequently added wood chips. This will occur over the course of a plurality of cycles. An equilibrium condition will be reached in the liquor, when first starting the process from fresh or white water, after only a few cycles.

In the present embodiment of the invention, the pressure chamber, containing the above described wood chip and equilibrium liquor mixture, is made pressure tight, and heat is applied, preferably direct steam heat, to bring a rapid rise throughout the mass to a temperature of 210° C. This temperature is held constant for an interval in the order of ten minutes to allow a suitable degree of dispersion of solubles and dispersibles and to allow precipitation of a substantially equal weight of polymerized dispersants.

The above time and temperature limitations have been determined through considerable analysis, based on the above described preferred wood chip size and the use of pine wood as the ligno-cellulosic raw material. The critical limitations of time and temperature are directed toward polymerizing the most efficient percentage of water dispersible elements of the ligno-cellulose with the least deleterious effect upon the cellulose fiber structure. A variation in the source and size of raw ligno-cellulose material is found to require variation from the above time and temperature within a range of from 5 to 30 minutes and from 190° to 250° C. respectively, with preferably a substantially proportional variation of each for any given case.

At completion of the above described time of high temperature conversion, the processed wood chips are separated from the liquor by any suitable, rapid straining means, with care being taken to avoid the loss of any of the liquor not absorbed by the wood chips. Due to unavoidable water absorption of the chips, a certain percentage of liquor is removed from the pressure chamber in each separation operation and, thus, fresh water, or white water need be added in the following cycle in only a sufficient quantity to maintain the chips in freely dispersed condition during conversion. It will be quite apparent that any non-polymerized lignin present in this absorbed liquor is still not lost from the processed chip. All subsequent processes are arranged to avoid, as much as possible, any action, such as washing, which might remove any incompletely resinified components present. Thus, it is found that since the liquor remains unaltered from cycle to cycle after equilibrium is reached, the subsequent cycles produce a processed or converted wood chip with a solids content in the order of 95% of the original weight, the water soluble and dispersible portion of which has been transformed or polymerized to a high degree into relatively gummy, resinified form. A 5% by weight loss in the form of volatiles, e. g. hydrocarbons and hydrogen, is the only loss from the original ligno-cellulose in the polymerization or resinification process, practiced in accordance with the present invention, and is unavoidable and inconsequential, according to present day theories.

Following the conversion and separation of the wood chips by the above method, the processed chips are fibrated, preferably by grinding between opposed, closely spaced rotary grinding wheels, as is well known in the art. The resultant fibers are dispersed in a white water carrier to be formed and dewatered on a foraminous conveyor into the usual web form, and thence consolidated, wet or dry, by suitable heat and pressure, as is well known in the art, into hard, dense grainless board.

In one modification of the invention, it has been found that the addition of lime or other suitable basic material to the conversion liquor, in only sufficient amount to adjust the natural acid pH, of about 3.0, to a pH in the order of 5 to 5.5, will decrease and stabilize the rate of reaction in the liquor to provide a greater recovery of converted and modified ligno-cellulose by reason of a lesser conversion to wood sugars. This modification may be made in the process of the invention without need for change in the above described time or temperature conditions.

Thus, as has been stated, the primary advantage of the invention lies in the substantial elimination of pyrolysis of the cellulose, or conversion to soluble, worthless wood sugars, and the elimination of the prior loss of incompletely resinified lignins. As a result of these factors, hardboard, manufactured in accordance with this invention, has been found to have in the order of 25% greater modulus of rupture in comparison to respective prior hardboard. This can undoubtedly be attributed, to the greatly lessened damage to fibers in the novel process in comparison to prior processes, as well as to the improved character and quantity of binding lignins. Water absorption and swelling of the hardboard made in accordance with this invention has proven to be only half of that of respective prior hardboard, theoretically due to the improved yield of resinified lignins in the process of the invention.

A still further advantage of the present invention, of considerable importance, is the avoidance of the very considerable amount of stream pollution which resulted from prior processes. It will be understood that all prior processes involved dispersions of the woody material at some step or steps, or subjection to steam, which all carried off an undesirably large portion of the water dispersibles, and when disposed of in streams and waterways, created a definitely undesirable pollution problem. It will be apparent that when this dispersion occurs in a liquor which is continuously retained and recycled, recovering all of the non-gaseous matter, the pollution problem is eliminated.

Having completed a detailed disclosure of a preferred embodiment of my invention so that those skilled in the are may practice the same, I contemplate that variations may be made without departing from the essence of the invention or the scope of the appended claims.

I claim:

1. In the manufacture of heat and pressure consolidated wood-fiber hardboard, the preparation of ligno-cellulose chips, comprising the steps of a pyroligneous acid conversion of said chips at a temperature of from 190° to 250° C. under super-atmospheric pressure for a period of from 5 to 30 minutes while dispersed in an aqueous liquor formed from substantially the entire process liquor of prior successive conversions, and separation of said chips from said liquor.

2. In the manufacture of heat and pressure consolidated wood-fiber hardboard, the preparation of ligno-cellulose chips, comprising the steps of an autogenous conversion of said chips at a temperature of from 190° to 250° C. under super-atmospheric pressure for a period of from 5 to 30 minutes while dispersed in an aqueous liquor formed from substantially the entire process liquor of prior successive conversions and only sufficient lime to maintain the pH of the liquor at approximately 5 to 5.5, and separation of said chips from said liquor.

3. The polymerization and insolubilization of certain water soluble and dispersible phases of lignin in ligno-cellulose chips for the manufacture of hardboard, comprising the steps of maintaining a liquor containing soluble and dispersed phases of said chips, heating successive batches of ligno-cellulose chips dispersed in said liquor, said heating including a rapid rise in temperature to from 190° to 250° C. in a pressure-tight container, maintaining said high temperature and the super-atmospheric pressure produced thereby for a period of from 5 to 30 minutes, removing the water soluble and dispersible phases from said chips, polymerizing and insolubilizing said dissolved and dispersed phases disposed in said liquor, precipitating onto said chips a weight of polymerized and insolubilized matter disposed in the liquor substantially equal to the weight of water soluble and dispersible matter previously removed therefrom, separating said converted chips from said liquor, and recovering separately all of said liquor for subsequent cycles.

4. In the manufacture of heat and pressure consolidated wood-fiber hardboard, the preparation of wood-fiber chips comprising the steps of polymerization of hydrolyzed and dispersed components from wood by means of an autogenous conversion reaction at a temperature of from 190° to 250° C. under super-atmospheric pressure, for a period of from 5 to 30 minutes, disposing said chips throughout said conversion freely dispersed in an aqueous liquor formed from substantially the entire process liquor from prior successive conversions, and separation of said chips from said liquor.

5. A method for polymerizing and utilizing hydrolyzable and dispersible phases of ligno-cellulose in the manufacturing of wood-fiber, heat and pressure consolidated hardboard, comprising the steps of hydrolyzing and dispersing in an aqueous liquor said phases from wood chips having a dimension across the grain of less than ½" and a dimension with the grain of at least ⅜" by a high temperature, high pressure conversion, while said chips are substantially freely dispersed in said liquor, said conversion being conducted at from 190° to 250° C. in a pressure-tight container for from 5 to 30 minutes, separating the chips from said liquor, conducting a plurality of successive conversions thereafter in said separated liquor with fresh chips for each conversion, whereby the said soluble and dispersible phases from said original conversions are substantially entirely polymerized, insolubilized and precipitated on the chips of said successive conversions, providing a converted wood chip of high yield and particularly adapted to form an improved hardboard.

6. A method of making heat-consolidated wood-fiber hardboard comprising the steps of fragmentizing raw wood, subjecting said fragmentized wood in a pressure-tight container to a high temperature-pressure conversion in an aqueous liquor formed by a plurality of prior conversions and only sufficient make-up water to maintain the chips freely dispersed therein, said conversion comprising the steps of a rapid rise in temperature to from 190° to 250° C., maintaining said high temperature and the super-atmospheric pressure produced thereby for a period of from 5 to 30 minutes, thereafter rapidly separating said wood from said liquor, reducing said wood substantially to fibers, forming a mat therefrom and consolidating said mat by suitable heat and pressure.

References Cited in the file of this patent

UNITED STATES PATENTS

| | | |
|---|---|---|
| 530,635 | Blackman | Dec. 11, 1894 |
| 1,690,954 | Spencer | Nov. 6, 1928 |
| 1,803,737 | Sweeney | May 5, 1931 |
| 2,007,348 | Scharmann et al. | July 9, 1935 |
| 2,297,635 | Schorger | Sept. 29, 1942 |
| 2,538,742 | Willey | Jan. 16, 1951 |
| 2,591,106 | Sutherland | Apr. 1, 1952 |

FOREIGN PATENTS

| | | |
|---|---|---|
| 12,149 of 1933 | Australia | Apr. 19, 1934 |
| 464,588 | Canada | Apr. 25, 1950 |
| 638,496 | Great Britain | June 7, 1950 |

OTHER REFERENCES

Hydrotropic Solutions as Solvents of Lignin by Pelipetz, pub. by Columbia University, New York (1937), p. 31.